US008988869B2

(12) United States Patent  (10) Patent No.: US 8,988,869 B2
Ogatsu  (45) Date of Patent: Mar. 24, 2015

(54) PORTABLE DEVICE

(75) Inventor: Toshinobu Ogatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 246 days.

(21) Appl. No.: 13/634,858

(22) PCT Filed: Apr. 7, 2011

(86) PCT No.: PCT/JP2011/002067
§ 371 (c)(1),
(2), (4) Date: Sep. 13, 2012

(87) PCT Pub. No.: WO2011/145259
PCT Pub. Date: Nov. 24, 2011

(65) Prior Publication Data
US 2013/0010430 A1 Jan. 10, 2013

(30) Foreign Application Priority Data
May 20, 2010 (JP) .................. 2010-116121

(51) Int. Cl.
H05K 5/00 (2006.01)
H05K 7/00 (2006.01)
G06F 1/16 (2006.01)
H04M 1/02 (2006.01)

(52) U.S. Cl.
CPC ........... H04M 1/0237 (2013.01); G06F 1/1624 (2013.01)
USPC .............. 361/679.26; 361/679.3; 361/679.55; 455/575.4

(58) Field of Classification Search
USPC ............... 361/679.26, 679.3, 679.55, 679.56, 361/724, 725, 726, 727; 455/575.4
See application file for complete search history.

(56) References Cited

U.S. PATENT DOCUMENTS 7,583,496 B2 *  9/2009 Lai .............................. 361/679.3
8,369,076 B2 *  2/2013 Chuang et al. ........... 361/679.27
8,587,938 B2 * 11/2013 Ahn et al. .................. 361/679.3
2004/0157653 A1 *  8/2004 Kato .......................... 455/575.4

(Continued)

FOREIGN PATENT DOCUMENTS

CN      101001269 A    7/2007
EP      1 988 691 A2   11/2008

(Continued)

OTHER PUBLICATIONS

International Search Report in PCT/JP2011/002067 dated Jul. 5, 2011 (English Translation Thereof).

(Continued)

Primary Examiner — Anthony Haughton
(74) Attorney, Agent, or Firm — McGinn IP Law Group, PLLC

(57) ABSTRACT

A portable device includes a first unit including a guide member with a groove, the guide member extending in a sliding direction, and a second unit including a sliding member that slides in the groove of the guide member, in which the groove of the guide member includes a curved section that makes the first unit incline at a predetermined angle with respect to the second unit in an extended state, and the sliding member includes an engaging section that engages with the groove of the guide member, the engaging section being configured to support one surface of the groove of the guide member at at least two points and support another surface of the groove by a surface.

20 Claims, 19 Drawing Sheets

(56) References Cited

U.S. PATENT DOCUMENTS

| | | |
|---|---|---|
| 2005/0215298 A1 | 9/2005 | Lee |
| 2010/0120479 A1* | 5/2010 | Ogatsu ................. 455/575.4 |

FOREIGN PATENT DOCUMENTS

| | | |
|---|---|---|
| JP | 2003-234809 A | 8/2003 |
| JP | 2005-269566 A | 9/2005 |
| JP | 2005-286994 A | 10/2005 |
| JP | 2006-005564 A | 1/2006 |
| JP | 2008-113067 A | 5/2008 |
| WO | WO 2008/120701 A1 | 10/2008 |

OTHER PUBLICATIONS

Chinese Office Action dated May 28, 2014 with an English translation thereof.

* cited by examiner

PORTABLE DEVICE

TECHNICAL FIELD

The present invention relates to a portable device such as a mobile phone, a digital camera, and an electronic personal organizer, in particular a sliding mechanism for these portable devices.

BACKGROUND ART

In recent years, the intended purpose of portable devices is not limited to simple telephone calls, but includes wide range of other purposes including transmission/reception of electronic mails, connection to the Internet, and video game functions. Therefore, the development of portable devices having various mechanisms for satisfying both the portability and the operability such as large screen display and a character input function has been in progress.

For example, there is a folding-type portable device, which is usually carried in a folded state. Then, when it is used for a telephone call or mail transmission/reception, it is extended so that the display unit and the operation unit are exposed and various operations can be thereby performed. The folding-type portable device can prevent incorrect operations from being performed when it is carried. However, when it is in the folded state, the display unit is not exposed. Therefore, it is impossible to perform almost all the functions. Therefore, it is necessary to separately provide another display unit that can be viewed in the folded state.

In contrast to this, as for a slide-type portable device, the display unit is always exposed irrespective of whether the portable device is in a retracted state or in an extended state. Therefore, the display unit can be viewed in any state. By providing a minimum key operation unit at the bottom of the display unit, certain operations such as reading an electronic mail and performing an operation on the Internet can be performed, even when it is in the retracted state, i.e., when it is being carried, without changing the portable device from the retracted state. Therefore, the usability is improved. Further, when a user performs an operation such as creating a mail document, the display unit and the key operation unit are slid in parallel so that another key operation unit disposed below the liquid crystal unit is exposed and the user can operate that key operation unit (see Patent literature 1).

In contrast to this, since the full length of the folding-type portable device in the extended state becomes almost twice as long as the length in the folded state, it is possible to secure a large key operation surface. Further, it is possible to dispose the display unit at a certain angle with respect to the operation unit. Therefore, the folding-type portable device has excellent usability both when an operation is performed and when a telephone call is carried out. Further, as a technique in which this feature of the folding-type portable device is incorporated into the slide-type portable device, there are a technique that enables the display unit to be completely detached from the key operation unit (see Patent literature 2) and a technique that enables the display unit to be disposed at a certain angle with respect to the key operation unit (see Patent literatures 3 and 4). Further, Patent literature 5 discloses a technique that enables a portable device to have a large inclination angle after a sliding action is performed.

CITATION LIST

Patent Literature

Patent literature 1: Japanese Unexamined Patent Application Publication No. 2005-286994

Patent literature 2: Japanese Unexamined Patent Application Publication N 2003-234809

Patent literature 3: Japanese Unexamined Patent Application Publication No. 2005-269566

Patent literature 4: Japanese Unexamined Patent Application Publication No. 2006-005564

Patent literature 5: Japanese Unexamined Patent Application Publication No. 2008-113067

SUMMARY OF INVENTION

Technical Problem

In the case of the folding-type portable device, the inclination angle between the key operation unit and the display unit is about 5° to 10°. This angle is determined so that the shape of the portable device conforms to the shape of a human face. Further, it is determined so that the display unit does not fall backward when the portable device is placed in the unfolded state. However, there is a problem in the slide-type portable device that it is very difficult to fix the portable device in a state where the display unit is disposed at a certain angle with respect to the key operation unit equipped with a mouthpiece as in the case of the folding-type portable device.

The above-listed Patent literature 3 discloses a technique that enables the display unit to be disposed at a certain angle with respect to the key operation surface. However, in the technique disclosed in Patent literature 3, the key operation surface itself of the lower unit of the portable device has a certain angle and the lower unit itself is thereby inclined. Therefore, the size of the sliding mechanism for providing the inclination mechanism becomes larger. Therefore, the thickness of the lower unit increases, thus increasing the overall thickness of the portable device.

In view of the above-described problems, an object of the present invention is to reduce the size of the sliding mechanism of a portable device equipped with an inclination mechanism.

Solution To Problem

A portable device according to the present invention includes: a first unit including a guide member with a groove, the guide member extending in a sliding direction; and a second unit including a sliding member that slides in the groove of the guide member, in which the groove of the guide member includes a curved section that makes the first unit incline at a predetermined angle with respect to the second unit in an extended state, and the sliding member includes an engaging section that engages with the groove of the guide member, the engaging section being configured to support one surface of the groove of the guide member at at least two points and support another surface of the groove by a surface.

Advantageous Effects of Invention

According to the present invention, it is possible to reduce the size of the sliding mechanism of a portable device equipped with an inclination mechanism.

DESCRIPTION OF EMBODIMENTS

Figure 1:
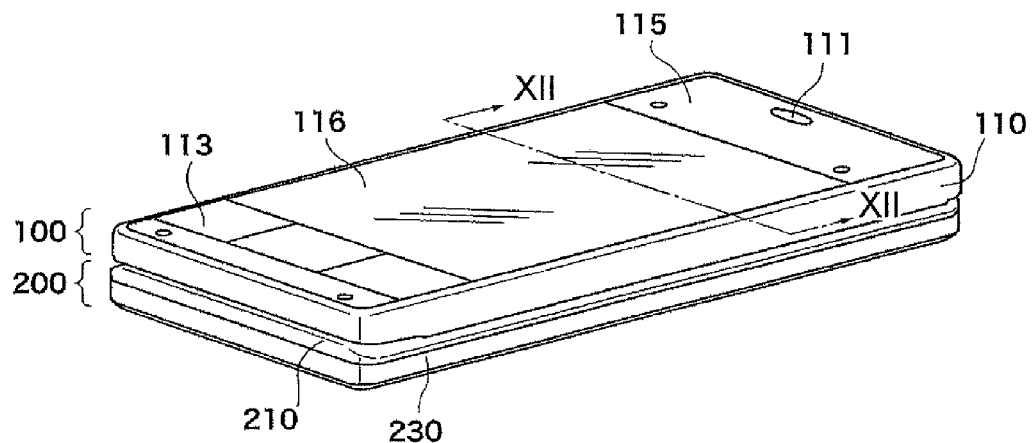
FIG. 1 is a perspective view showing a portable device in a retracted state according to an exemplary embodiment.
Figure 2:
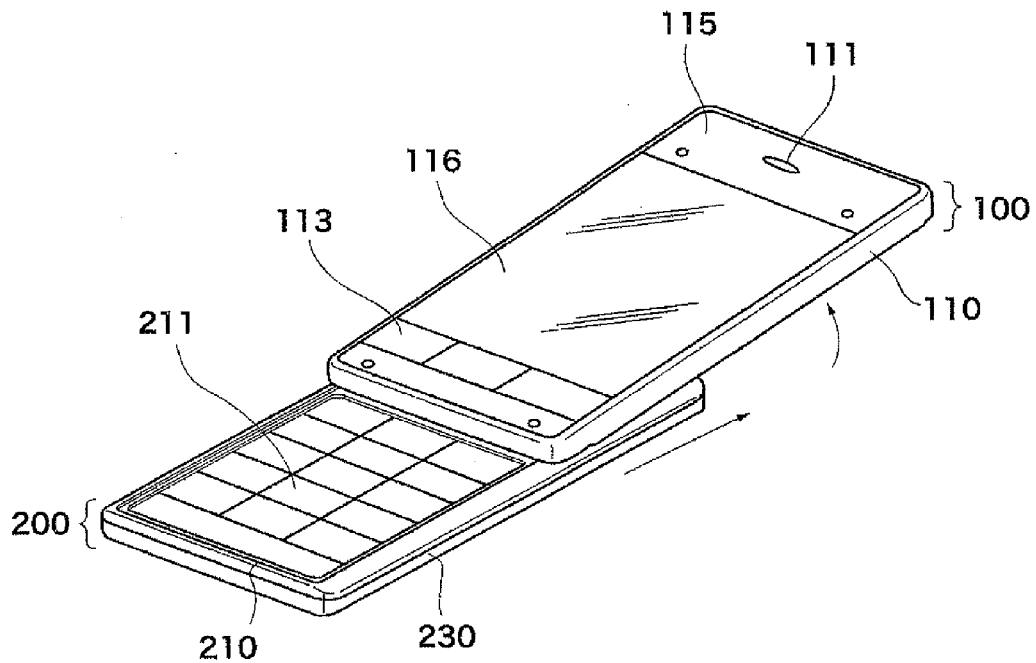
FIG. 2 is a perspective view showing a portable device in an extended state according to an exemplary embodiment.

Exemplary embodiments according to the present invention are explained hereinafter with reference to the drawings. FIG. 1 is a perspective view showing a portable device in a retracted state according to this exemplary embodiment. FIG. 2 is a perspective view showing a portable device in an extended state according to this exemplary embodiment. As shown in FIGS. 1 and 2, a portable device according to this exemplary embodiment includes an upper unit (first unit) 100 and a lower unit (second unit) 200. The upper unit 100 includes an upper case 110 and an upper cover 115 that covers this upper case 110. A receiver sound hole 111, a display-unit cover 116, and a key operation unit 113 are provided in the upper cover 115. Further, a circuit board (not shown) on which electronic components for transmission/reception and for display are mounted is provided inside the upper unit 100.

The lower unit 200 includes a lower case 210 and a lower cover 230 that covers this lower case 210. As shown in FIG. 2, a key operation unit 211 is provided in the lower case 210. Further, a battery(s), semiconductor components necessary for communication and software operations, a circuit board on which those components are mounted, an antenna, a connector(s) for external connection, a vibration motor, and the like (all of which are not shown) are provided inside the lower unit 200.

As shown in FIG. 1, the upper unit 100 and the lower unit 200 are positioned on top of each other as viewed from the top (as viewed from a position opposed to the upper cover 115) in a retracted state. Further, as shown in FIG. 2, the upper unit 100 and the lower unit 200 are slid from each other to the positions where they are displaced from each other in an extended state as viewed from the top. Further, the upper unit 100 is inclined at a predetermined angle with respect to the lower unit 200 in the extended state.

Figure 3:
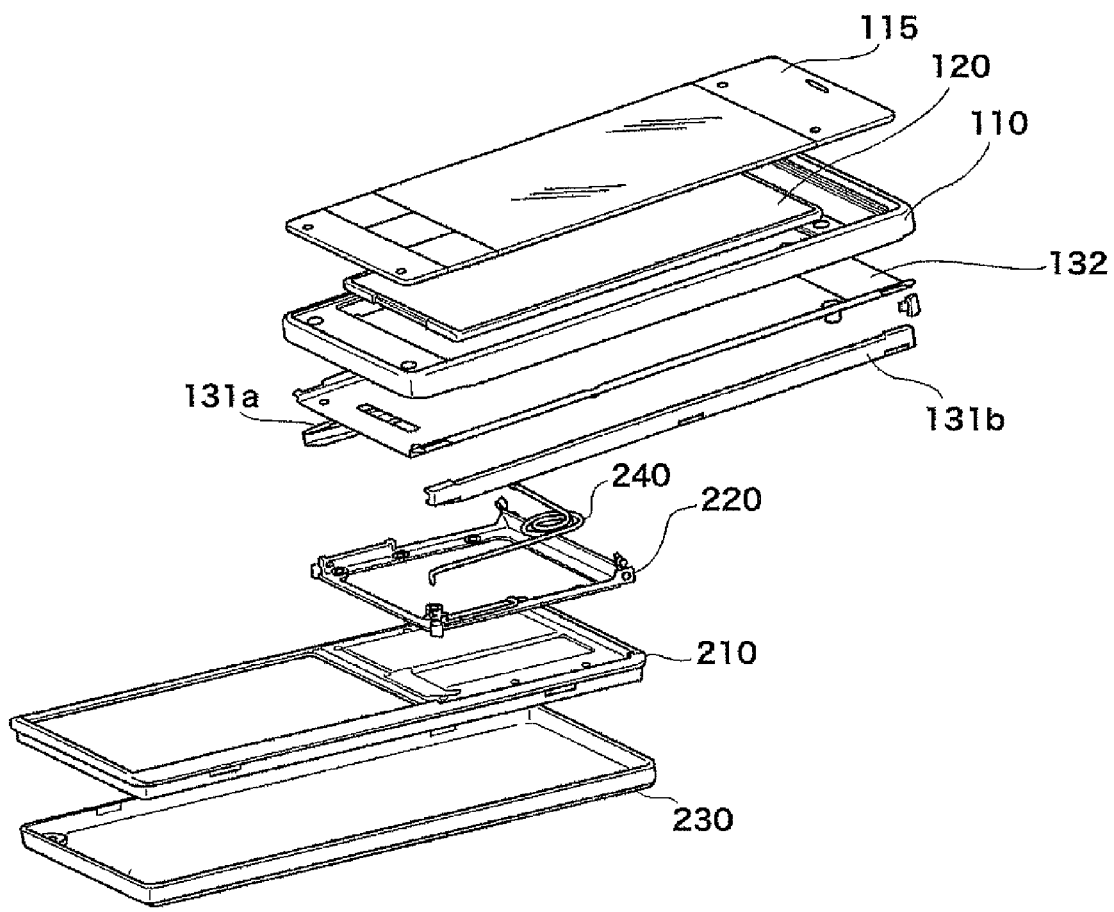
FIG. 3 is a perspective view showing a portable device according to an exemplary embodiment in a disassembled state.
Figure 4:
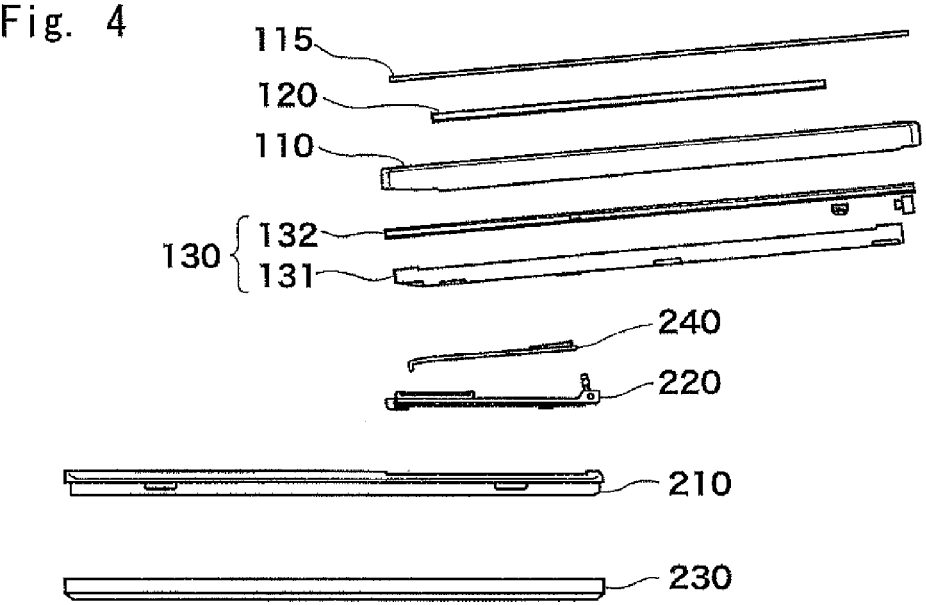
FIG. 4 is a side view showing a portable device according to an exemplary embodiment in a disassembled state.

FIG. 3 is a perspective view showing the portable device according to this exemplary embodiment in a disassembled state, and FIG. 4 shows its side view. As shown in FIGS. 3 and 4, the upper unit 100 includes an upper cover 115, a display unit 120, an upper case 110, guide members 131a and 131b, and a connecting plate 132. The display unit 120 is, for example, a liquid crystal display or an organic EL display. The guide members 131a and 131b are attached to both sides of the connecting plate 132 in such a manner that they extend in the sliding direction, and these components form a guide member unit 130.

Further, the lower unit 200 includes a lower cover 230, a lower case 210, a sliding member 220, and a torsion spring 240. Further, the sliding member 220 of the lower unit 200 is attached in such a manner that the sliding member 220 slides in the guide members 131a and 131b of the guide member unit 130 of the upper unit 100. In this way, the upper unit 100 and the lower unit 200 are slidably attached to each other. The torsion spring 240 is disposed in such a manner that one end of the torsion spring 240 is fixed to the upper unit 100 and the other end is fixed to the lower unit 200, and assists user's manual operation when the user extends or retracts the upper unit 100 and the lower unit 200. Further, a connection cable(s) (not shown) is provided between the upper unit 100 and the lower unit 200 to transmit their electric signals.

Figure 5:
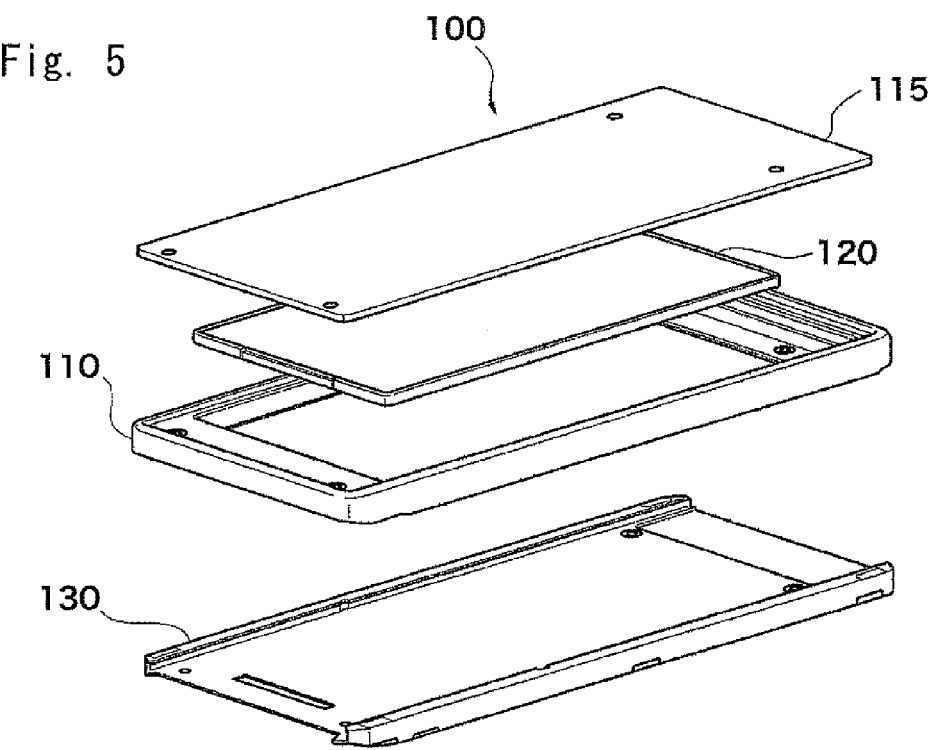
FIG. 5 is a perspective view showing a portable device with a disassembled upper unit according to an exemplary embodiment.
Figure 6:
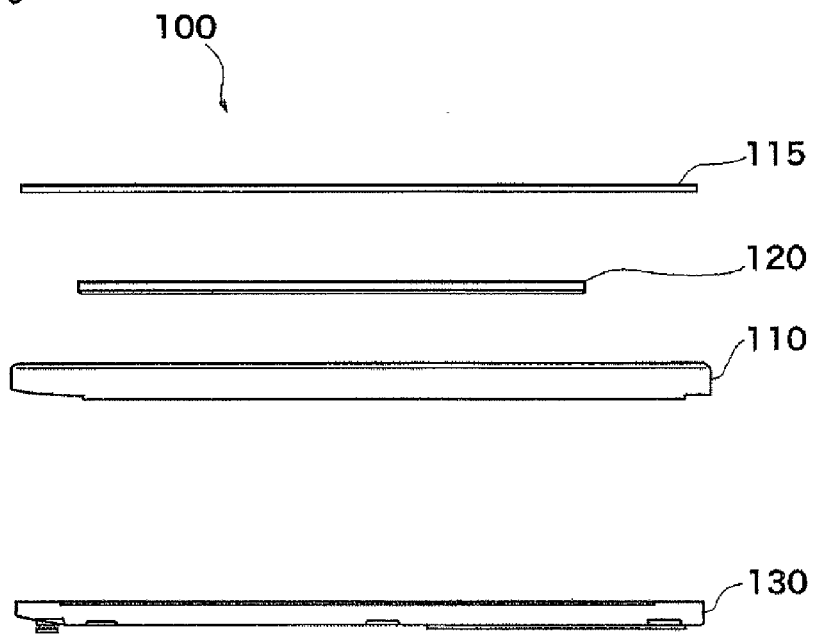
FIG. 6 is a side view showing a portable device with a disassembled upper unit according to an exemplary embodiment.

FIG. 5 is a perspective view showing the portable device with a disassembled upper unit according to this exemplary embodiment, and FIG. 6 shows its side view. As shown in FIGS. 5 and 6, a display unit 120 is attached to the upper case 110 and the upper cover 115 is attached so as to cover this display unit 120 and the upper part of the upper case 110. By attaching the upper cover 115 so as to cover the display unit 120 in this manner, it is possible to protect the display unit 120 from external impacts. Further, the guide member unit 130 is attached to the lower part of the upper case 110.

Figure 7:
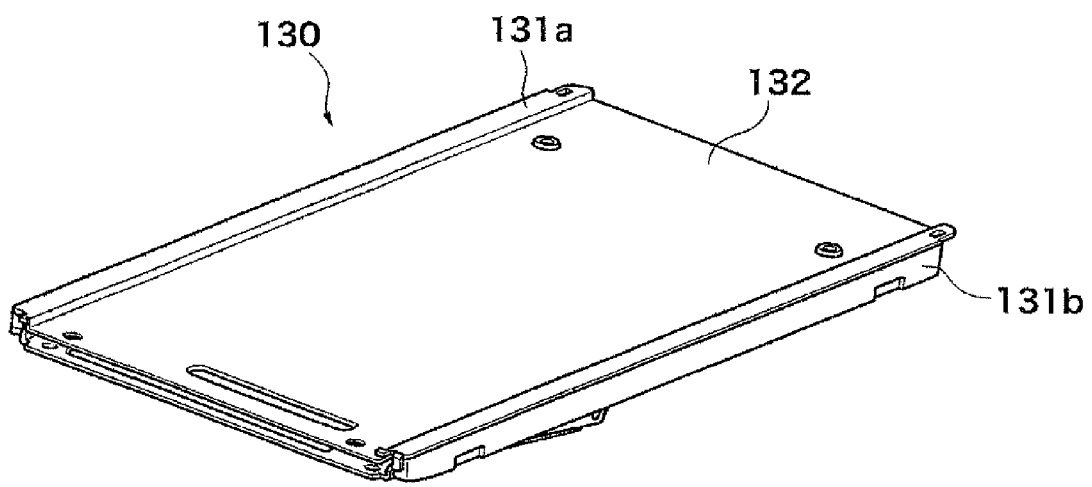
FIG. 7 is a perspective view of a guide member unit of a portable device according to an exemplary embodiment.
Figure 8:
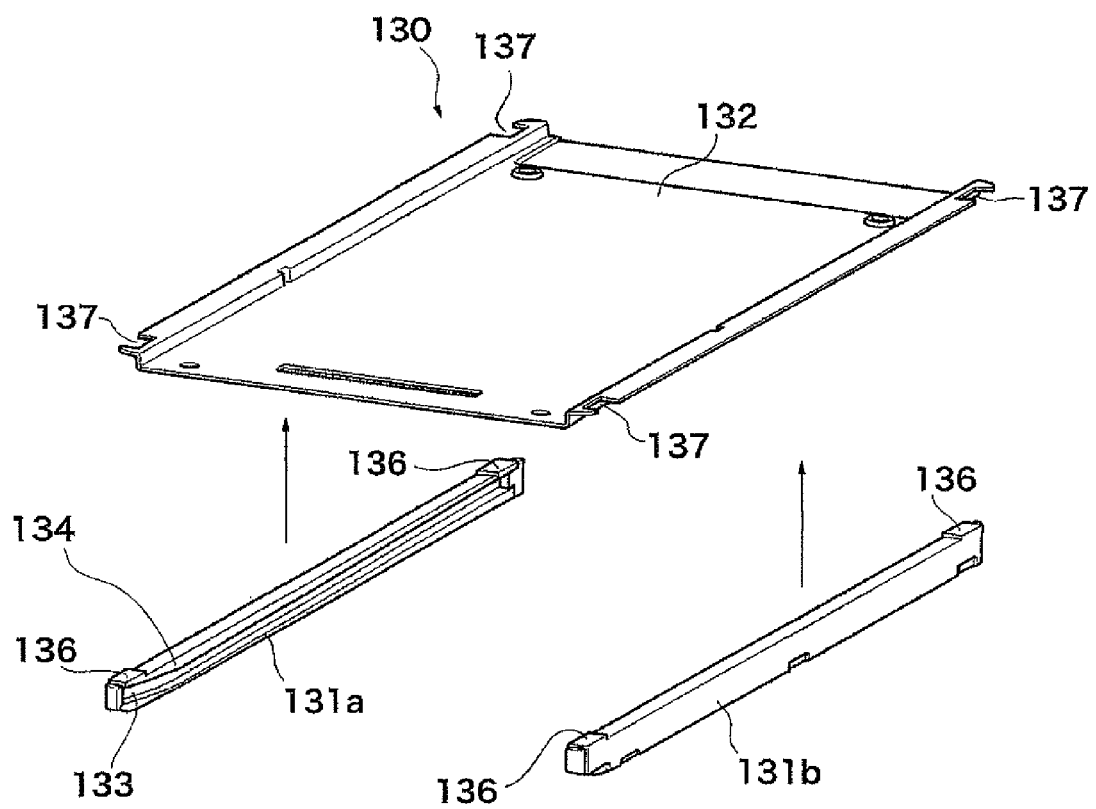
FIG. 8 is a perspective view showing a portable device with a disassembled guide member unit according to an exemplary embodiment.

FIG. 7 is a perspective view of the guide member unit of the portable device according to this exemplary embodiment. Further, FIG. 8 is a perspective view showing the portable device with a disassembled guide member unit according to this exemplary embodiment. The guide member unit 130 includes guide members 131a and 131b, and a connecting plate 132. The connecting plate 132 has such a configuration that it can be attached to the upper case 110. Preferable material for both the connecting plate 132 and the guide members 131a and 131b is stainless steel. However, they can be formed of metal material other than stainless steel. For example, they can be formed of metal material containing at least one of steel, an aluminum alloy, a magnesium alloy, and a titanium alloy. The thickness of the connecting plate 132 directly influences the thickness of the assembled apparatus. Therefore, it is desirable to reduce the thickness of the connecting plate 132 in order to reduce the thickness of the portable device. Further, the guide members 131a and 131b can be fabricated by, for example, cutting, forging, or molding.

When the connecting plate 132 and the guide members 131a and 131b are both made of stainless steel, they can be fixed by welding. By fixing them using welding, it is possible to withstand a large load even when the bonding area is small. Needless to say, if it is possible to secure a sufficient bonding area, they can be fixed by using an adhesive, adhesion, calking, or the like. A groove 133 is formed in each of the guide members 131a and 131b. The grooves 133 are formed on the inner sides of the guide members 131a and 131b, i.e., on the sides of the guide members 131a and 131b that face each other in such a manner that the grooves 133 extend in the longitudinal direction. A gently-curved curved section 134 is formed near one end of each of the grooves 133.

Further, as shown in FIG. 8, the parts to which the guide members 131a and 131b are attached are formed by bending both ends of the connecting plate 132 upward and then further bending them outward. As a result, the guide members 131a and 131b can be fixed to the connecting plate 132 more firmly. Note that by engaging protrusions 136 formed at both ends on the upper surfaces of the guide members 131a and 131b with cutouts formed at both ends of the respective bent parts of the connecting plate 132, the guide members 131a and 131b can be attached to the connecting plate 132. Further, by forming the bent parts at both ends of the connecting plate 132 in this manner, it is possible to increase the strength of the connecting plate 132.

Figure 9A:
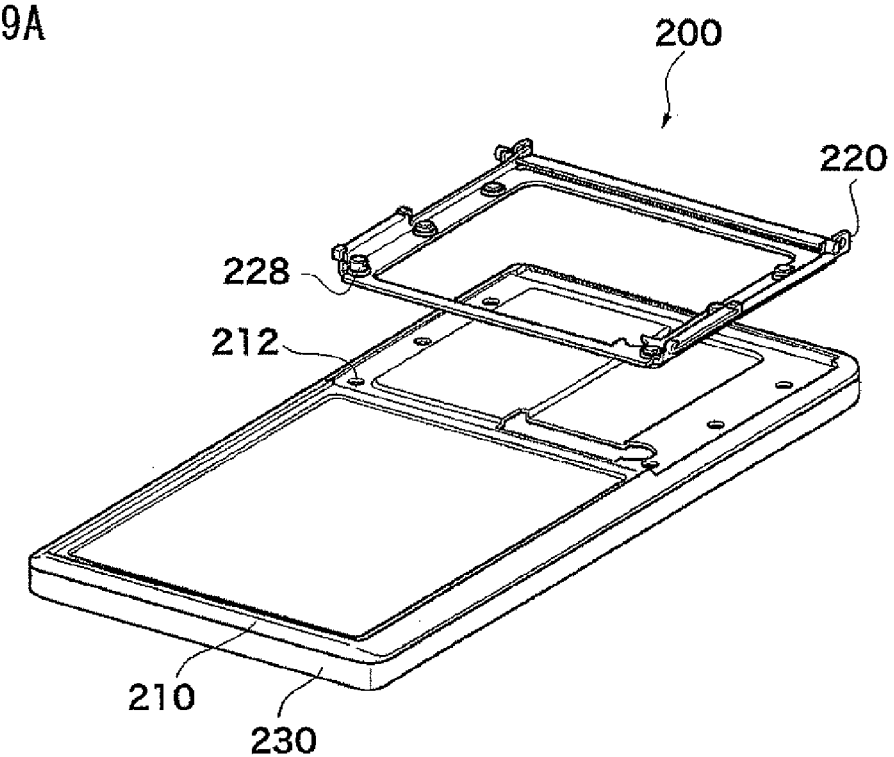
FIG. 9A is a perspective view of a lower unit of a portable device according to an exemplary embodiment (in a state where the guide member unit is detached from the lower unit)
Figure 9B:
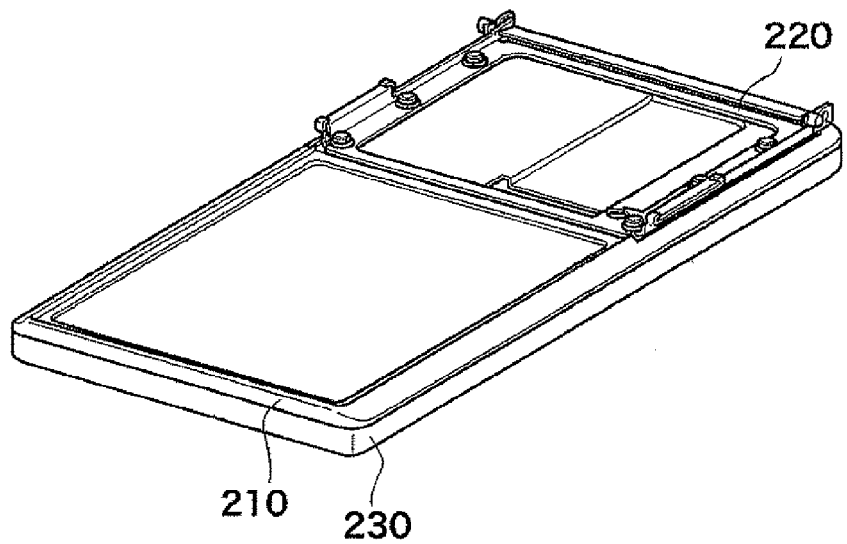
FIG. 9B is a perspective view of a lower unit of a portable device according to an exemplary embodiment (in a state where the guide member unit is attached to the lower unit)

FIGS. 9A and 9B are perspective views of the lower unit 200 of the portable device according to this exemplary embodiment. FIG. 9A shows a state in which the sliding member 220 is detached from the lower case 210, and FIG. 9B shows a state in which the sliding member 220 is attached to the lower case 210. The lower case 210 can be formed, for example, as a hybrid unit of a stainless-steel metal plate and an exterior resin in order to receive the load of the key operation unit. By doing so, it is possible to reduce the thickness of the lower unit 200. Needless to say, if the reduction of the thickness is not important in terms of the design, the lower case 210 can be formed by using a plastic resin, a magnesium alloy, or an aluminum alloy.

Further, as shown in FIG. 9A, mounting holes 228 (six mounting holes in FIG. 9A) for fixing the sliding member 220 to the lower case 210 are formed in the sliding member 220. Further, mounting parts 212 for fixing the sliding member 220 are provided in the places corresponding to the mounting holes 228 in the lower case 210. Further, the sliding member 220 can be fixed to the lower case 210 by providing fixing members such as screws in the mounting holes 228 of the sliding member 220 and the mounting parts 212 of the lower case 210.

Figure 10:
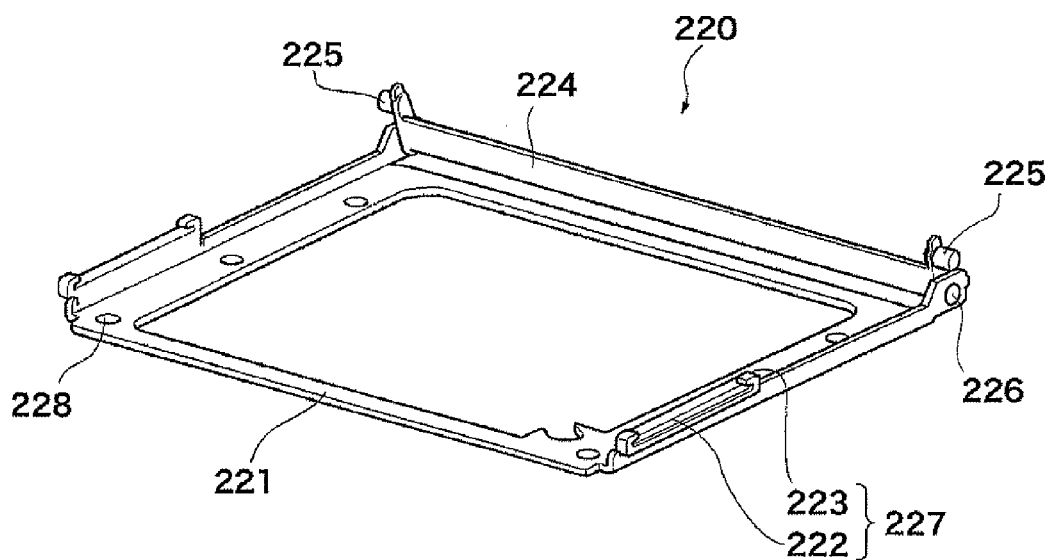
FIG. 10 is a perspective view of a sliding member of a portable device according to an exemplary embodiment.
Figure 11A:
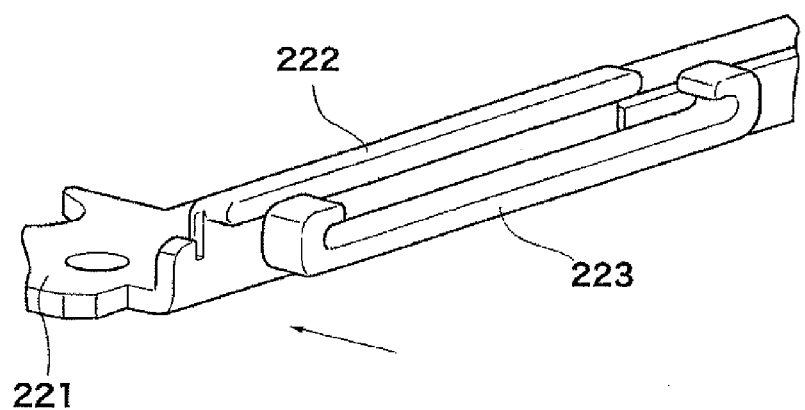
FIG. 11A is an enlarged view of an engaging section of a sliding member of a portable device according to an exemplary embodiment.
Figure 11B:
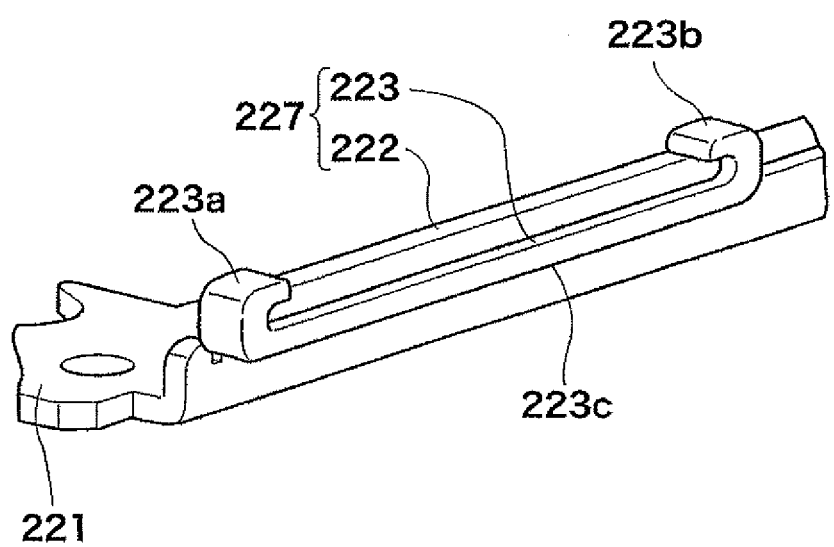
FIG. 11B is an enlarged view of an engaging section of a sliding member of a portable device according to an exemplary embodiment.

FIG. 10 is a perspective view of the sliding member 220 of the portable device according to this exemplary embodiment. The sliding member 220 includes engaging sections 227 that slidably engage with the grooves 133 of the guide members 131a and 131b of the upper unit 100, a base 221 that comes into contact with the lower case 210 when the sliding member 220 is attached to the lower case 210, and mounting holes 228. Since the sliding member 220 needs to be robust, the sliding member 220 is preferably made of steel-based material typified by stainless steel. FIGS. 11A and 11B are enlarged views of the engaging section 227 of the sliding member 220 shown in FIG. 10. The engaging section 227 of the sliding member 220 according to this exemplary embodiment can be formed, for example, by engaging a resin member 223 with a protrusion 222 of the sliding member 220 as shown in FIGS. 11A and 11B.

The protrusions 222 of the sliding member 220 can be formed by making parts of the wall surfaces that are formed by bending both sides of the base 211 of the sliding member 220, protrude outwardly. Further, the resin member 223 includes supporting parts 223a and 223b on the upper side and includes a flat section 223c on the lower side. A recessed section, in which no resin member is present, is formed between the supporting parts 223a and 223b. As shown in FIG. 11B, the resin member 223 is attached in such a manner that the resin member 223 covers the lower side and the right and left sides of the protrusion 222. Note that no resin member is present on part of the upper side of the protrusion 222, i.e., between the support members 223a and 223b, and therefore that part of the upper side of the protrusion 222 is exposed. Note that FIGS. 11A and 11B show an example in which no resin member is present between the support members 223a and 223b. However, the only requirement for this exemplary embodiment is to form a recessed section between the support members 223a and 223b. Therefore, for example, a configuration in which a resin member is provided between the support members 223a and 223b and a recessed section is formed in this resin member can be also employed.

Note that it is possible to improve the strength of the engaging section 227 by integrally forming the protrusion 222 with the sliding member 220 by using, for example, metal material such as stainless steel. In this way, it is possible to prevent the engaging sections 227 from being broken even if a stress is exerted in a different direction from the sliding direction when the engaging sections 227 engage with the guide member 131a or 131b. Further, the resin member 223 has a lubricating property. Therefore, by engaging the resin members 223 with the protrusions 222, the resistance that occurs when the engaging sections 227 slide in the grooves 133 of the guide members 131a and 131b can be reduced.

The resin member 223 needs to have a lubricating property and a withstanding property against a load caused by compression. Therefore, for example, an ordinary POM (polyacetal) resin can be used for the resin member 223. Alternatively, nylon resins, PBT (polybutylene terephthalate) resins, stronger PEEK (polyether ether ketone) resins, polyamide-based resins, PPS (poly(phenylene sulfide)) resins, ABS resins, and PC (polycarbonate) resins can be also used. By using these materials, it is possible to obtain an abrasion-resistance property, an excellent sliding property, and the like. In particular, PEEK resins are preferable material because of its load-withstanding property, abrasion-resistance property, and excellent sliding property.

Note that FIGS. 10, 11A and 11B show an example in which the engaging section 227 is composed of the protrusion 222 and the resin member 223. However, for example, the engaging section 227 may be integrally formed with the sliding member 220 together with the supporting parts 223a and 223b and the flat section 223c by using metal material. Note that the surface of the engaging section 227 made of metal material may be coated with a resin in order to reduce the resistance that occurs when the engaging section 227 slides in the groove 133 of the guide member. Further, if the strength of the sliding member 222 can be ensured, the engaging section 227 may be integrally formed with the sliding member 222 together with the supporting parts 223a and 223b and the flat section 223c by using resin material.

Further, as shown in FIG. 10, the sliding member 220 may include a shield member 224. By providing the shield member 224, it is possible to shield the mechanical section such as connection cables connected between the upper unit 100 and the lower unit 200 and the torsion spring 240 from the outside even when the portable device is in the extended state and the upper unit 100 is thereby inclined at a predetermined angle with respect to the lower unit 200. A rotation pin 226 and a shield member sliding pin 225 are provided on each of both sides in the longitudinal direction of the shield member 224 in such a manner that they protrude from the wall surface. Note that the pair of the shield member sliding pin 225 and the rotation pin 226 is formed in such a manner that they are arranged side by side in the longitudinal direction of the wall surface on each of both sides in the longitudinal direction of the shield member 224. The rotation pins 226 are disposed so as to engage with holes formed in the wall surfaces that are formed by bending both sides of the base 221. Further, the shield member sliding pins 225 are disposed so as to slidably engage with the grooves 133 of the guide members 131a and 131b.

Figure 12:
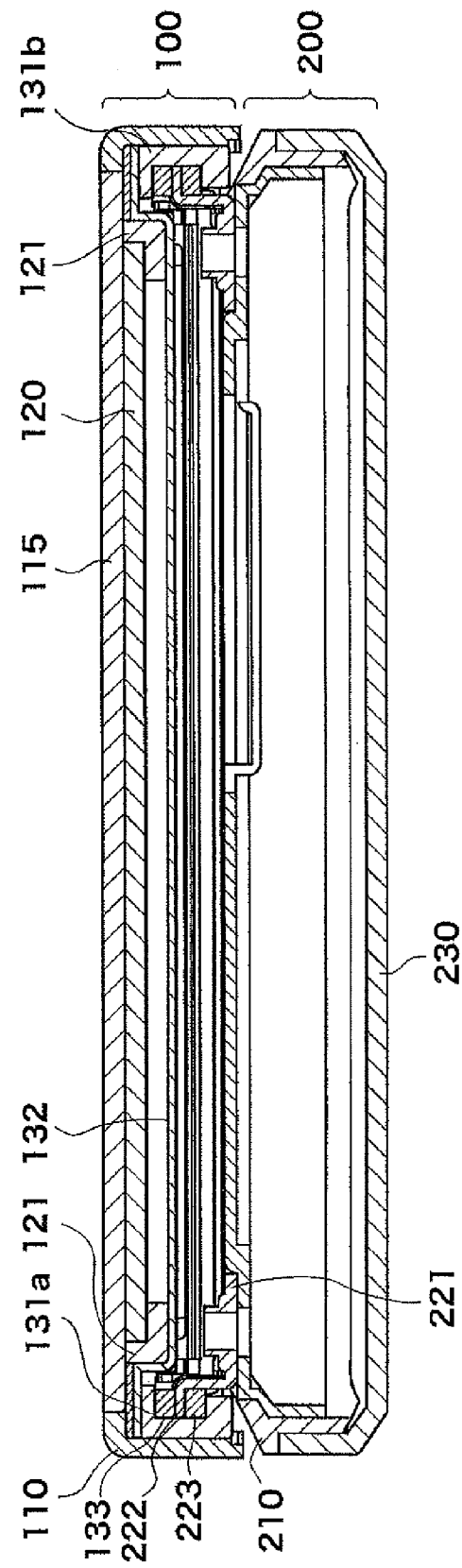
FIG. 12 is a cross-section of a portable device according to an exemplary embodiment, taken along the line XII-XII in FIG. 1.
Figure 13:
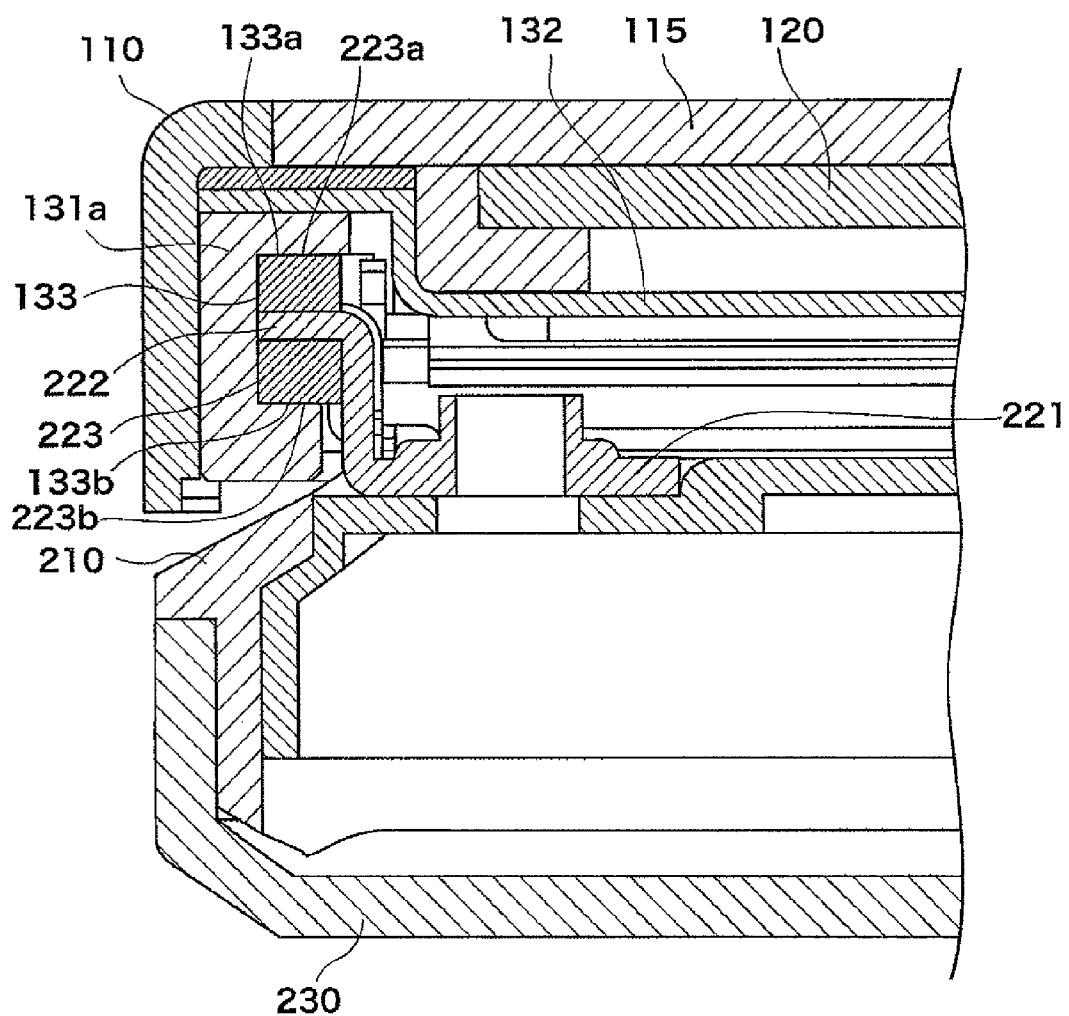
FIG. 13 is an enlarged view of a section near a guide member 131a in the cross-section shown in FIG. 12.

FIG. 12 is a cross-section of the portable device according to this exemplary embodiment, taken along the line XII-XII in FIG. 1. Further, FIG. 13 is an enlarged view of a section near the guide member 131a in the cross-section shown in FIG. 12. As shown in FIGS. 12 and 13, the upper case 110 is disposed on the sides of the upper unit 100 and the upper cover 115 is disposed on the top of the upper unit 100. The display unit 120 is disposed below the upper cover 115 in such a manner that display unit 120 is in contact with the upper cover 115. Further, the connecting plate 132 is disposed below the display unit 120 with a spacer(s) 121 interposed therebetween. The guide members 131a and 131b are respectively disposed on both sides of the connecting plate 132. Note that by bending both ends of the connecting plate 132 upwardly and then bending them outwardly, the mounting positions of the guide members 131a and 131b can be shifted to the upper cover 115 side.

Further, as shown in FIGS. 12 and 13, the lower cover 230 is attached to the lower case 210 of the lower unit 200. The base 221 of the sliding member 220 is attached above the lower case 210. Further, the engaging sections each composed of the protrusion 222 and the resin member 223 are disposed so as to engage with the grooves 133 of the guide members 131a and 131b. That is, the resin member 223 is disposed in such a manner that the support section 223a (and support section 223b) of the resin member 223 is in contact with the upper wall surface 133a of the groove 133 of the guide member 131a or 131b and the flat section 223c of the resin member 223 is in contact with the lower wall surface 133b of the groove 133 of the guide member 131a or 131b. In this case, a small space may be formed at least one of between the support section 223a (and support section 223b) of the resin member 223 and the upper wall surface 133a of the groove 133 and between the flat section 223c of the resin member 223 and the lower wall surface 133b of the groove 133. By forming a space in this manner, the resin member 223 can slide in the groove 133 more smoothly.

Figure 14A:
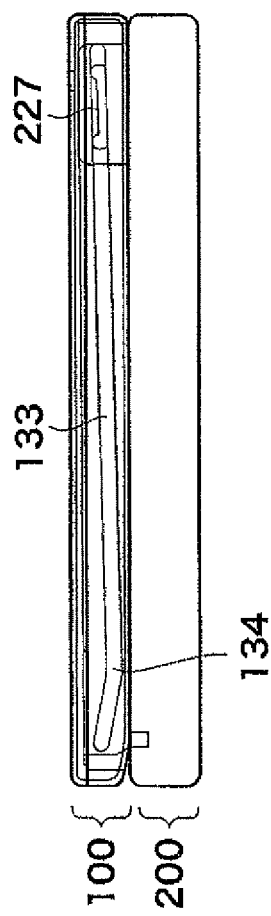
FIG. 14A is a figure for explaining an action of a portable device according to an exemplary embodiment and shows the portable device in a retracted state.
Figure 14B:
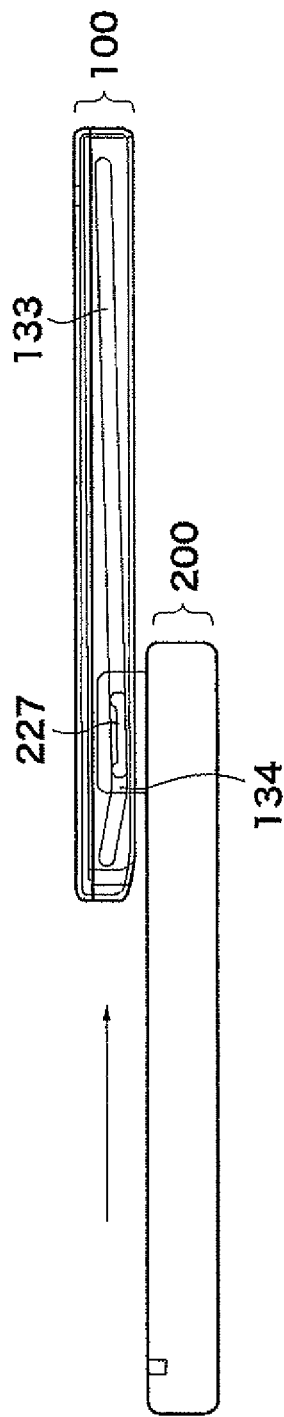
FIG. 14B is a figure for explaining an action of a portable device according to an exemplary embodiment (in a state where the portable device is in an intermediate state between a retracted state and an extended state)
Figure 14C:
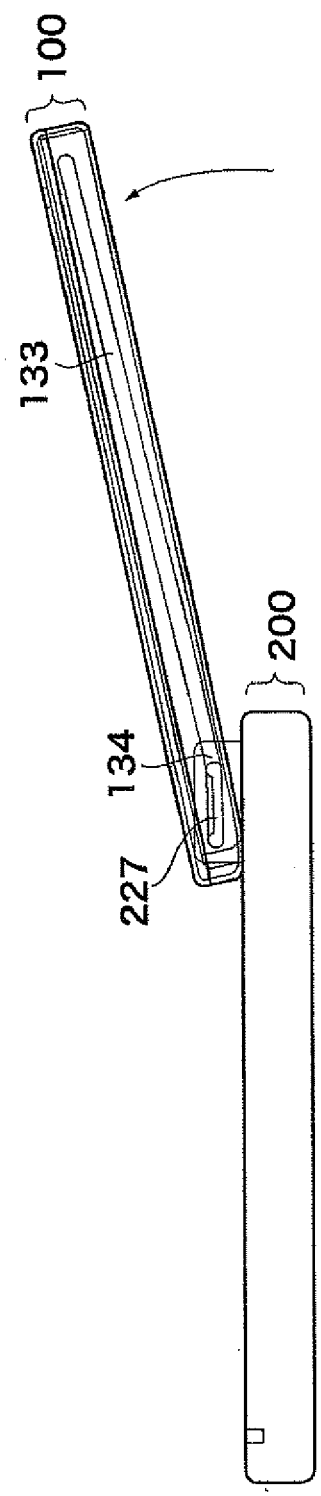
FIG. 14C is a figure for explaining an action of a portable device according to an exemplary embodiment (in an extended state of the portable device)

Next, an action of the portable device according to this exemplary embodiment is explained. FIGS. 14A, 14B and 14C are figures for explaining an action of the portable device according to this exemplary embodiment. FIG. 14A shows the portable device in the retracted state, and FIG. 14B shows the portable device in an intermediate state between the retracted state and the extended state. Further, FIG. 14C shows the portable device in the extended state. Each of FIGS. 14A, 14B and 14C shows a positional relation between the upper unit 100 and the lower unit 200 of the portable device and a positional relation of the engaging section 227 of the sliding member in the groove 133 of the guide member. Note that as shown in FIG. 14C, in the portable device according to this exemplary embodiment, the curved section 134 is provided in the middle of the groove 133 of the guide member so that the upper unit 100 is inclined with respect to the lower unit 200 in the extended state.

Next, an action performed from the retracted state shown in FIG. 14A to the extended state shown in FIG. 14C is explained. In the retracted state shown in FIG. 14A, the upper unit 100 and the lower unit 200 are positioned on top of each other as viewed from the top. In this state, the engaging section 227 is located on the right side of the groove 133 in the drawing. Then, when the upper unit 100 is moved to the right in the drawing, the engaging section 227 moves in the groove 133 and is positioned on the right side of the curved section 134 in the drawing as shown in FIG. 14B. Note that the groove 133 of the guide member may be inclined at a predetermined angle with respect to the upper/lower surfaces of the upper unit 100 in the range between the position on the right side of the upper unit 100 in the drawing and the curved section 134. By inclining the groove 133 at a predetermined angle in this manner, it is possible to prevent the upper unit 100 from coming into contact with the lower unit 200 when the upper unit 100 is slid to the right side in the drawing.

After the state shown in FIG. 14B, when the upper unit 100 is further moved to the right side in the drawing, the engaging section 227 passes through the curved section 134 and the upper unit 100 is inclined with respect to the lower unit 200 as shown in FIG. 14C. In this state, the engaging section 227 is located on the left side of the groove 133 in the drawing.

Figure 15A:
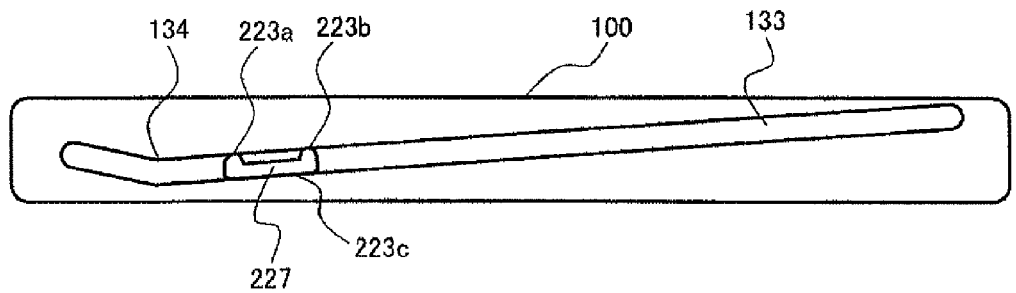
FIG. 15A is a figure for explaining a state where an engaging section of a sliding member of a portable device according to an exemplary embodiment moves in a groove of a guide member.
Figure 15B:
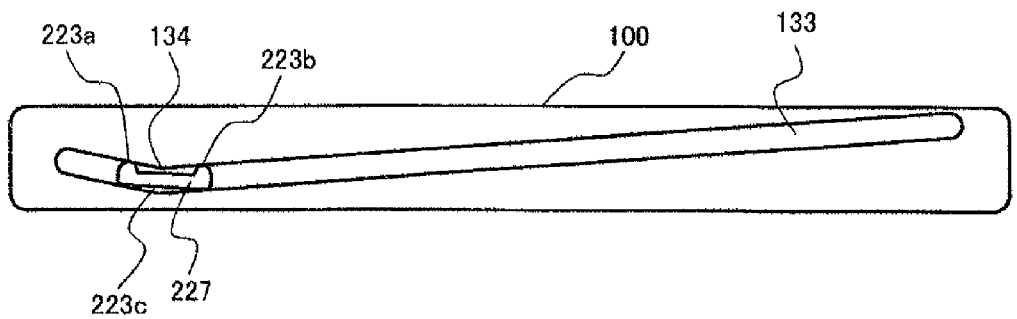
FIG. 15B is a figure for explaining a state where an engaging section of a sliding member of a portable device according to an exemplary embodiment moves in a groove of a guide member.
Figure 15C:
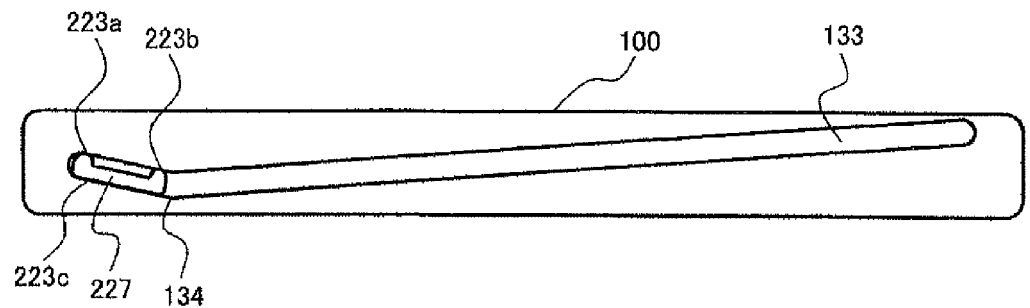
FIG. 15C is a figure for explaining a state where an engaging section of a sliding member of a portable device according to an exemplary embodiment moves in a groove of a guide member.

FIGS. 15A, 15B and 15C are figures for explaining a state where the engaging section 227 of the sliding member of the portable device according to this exemplary embodiment moves in the groove 133 of the guide member. As shown in FIG. 15A, the engaging section 227 moves in the part of the groove 133 that is located on the right side of the curved section 134 in the range between the retracted state of the portable device (state shown in FIG. 14A) and the intermediate state between the retracted state and the extended state (state shown in FIG. 14B). In this state, the upper part of the engaging section 227 is in contact with one of the inner wall surfaces (i.e., upper wall surface) of the groove 133 at the supporting parts 223a and 223b. Meanwhile, the lower part of the engaging section 227 is in contact with the other inner wall surface (i.e., lower wall surface) of the groove 133, which is opposed to the above-mentioned one of the inner wall surfaces of the groove 133, in the flat section 223c. In this case, a small space may be also formed at least one of between the support section 223a and 223b of the engaging section 227 and the upper wall surface 133a of the groove 133 and between the flat section 223e of the engaging section 227 and the lower wall surface 133b of the groove 133. By forming a space in this manner, the engaging section 227 can slide in the groove 133 more smoothly.

When the engaging section 227 passes through the curved section 134, the portable device becomes a state shown in FIG. 15B. That is, there is the cutout section (recessed section) between the supporting parts 223a and 223b of the engaging section 227. Therefore, when the engaging section 227 passes through the curved section 134, part of the guide member comes into this cutout section so that the engaging section 227 can smoothly pass through the curved section 134. Then, after the engaging section 227 passes through the curved section 134, the portable device becomes a state shown in FIG. 15C. This state shown in FIG. 15C is the state where the upper unit 100 is extended from the lower unit 200 (state shown in FIG. 14C).

As described above, in the portable device according to this exemplary embodiment, the supporting parts 223a and 223b are provided on one side of the engaging section 227 and these two points, i.e., supporting parts 223a and 223b support the upper wall surface of the groove 133. Therefore, when the engaging section 227 passes through the curved section 134, part of the guide members 131a and 131b can get into the space between the supporting parts 223a and 223b, and thus enabling the engaging section 227 to smoothly slide through the curved section 134. Further, by supporting the upper wall surface of the groove 133 at the two points, i.e., supporting parts 223a and 223b, the contact area between the engaging section 227 and the groove 133 can be reduced. Therefore, it is possible to reduce the friction that occurs when the engaging section 227 slides in the groove 133. Note that the distance between the supporting parts 223a and 223b of the engaging section 227 is determined based on the curvature of the curved section 134 of the groove 133. That is, the larger the curvature is, the shorter the distance between the supporting parts 223a and 223b becomes. Further, the smaller the curvature is, the longer the distance between the supporting parts 223a and 223b becomes.

Note that a similar advantageous effect to the above-described advantageous effect can be also achieved by adopting a configuration in which upper two points of the engaging section 227 are in contact with the upper wall surface and lower two points of the engaging section 227 are in contact with the lower wall surface (that is, two supporting parts are provided in each of the upper part and the lower part of the engaging section 227). However, when this configuration in which the wall surfaces of the groove are supported by the two points disposed in each of the upper and lower parts of the engaging section 227 is used and resin material is used for the engaging section 227, the resin is worn down more rapidly, and thus shortening the life span of the engaging section 227. Therefore, in the portable device according to this exemplary embodiment, the flat section 223c is provided in the other side of the engaging section 227 and the lower wall surface of the groove 133 is supported by the surface. In this way, even when resin material is used for the engaging section 227, it is possible to prevent the life span of the engaging section from becoming shorter. Further, by providing the flat section 223c on the other side of the engaging section 227, the strength of the engaging section 227 can be improved in comparison to the case where two supporting parts are provided in each of the upper and lower parts of the engaging section 227.

Figure 16A:
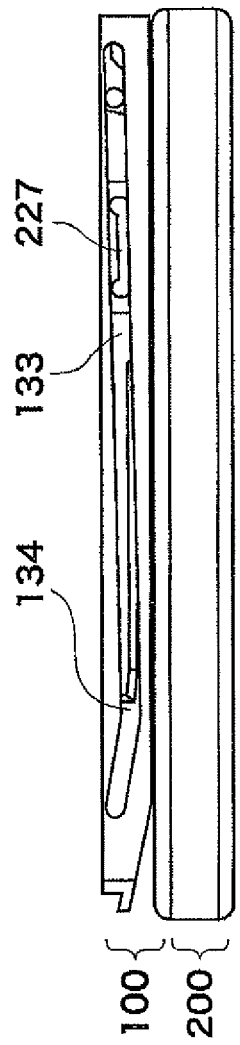
FIG. 16A is a side view for explaining an action of a shield member of a portable device according to an exemplary embodiment (in a retracted state)
Figure 16B:
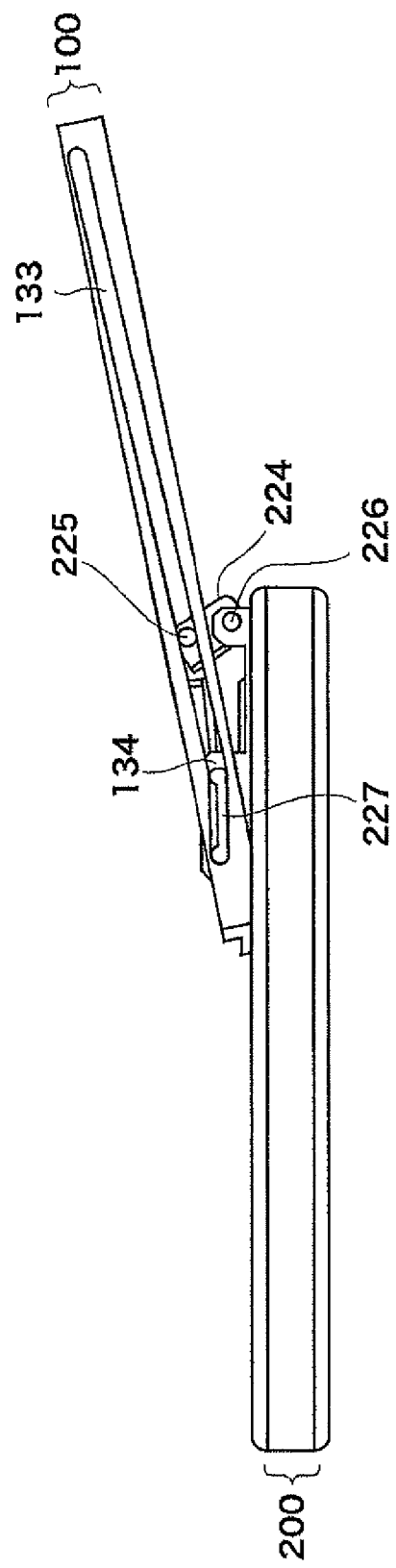
FIG. 16B is a side view for explaining an action of a shield member of a portable device according to an exemplary embodiment (in an extended state)

Next, an action of the portable device according to this exemplary embodiment in a case where the sliding member 220 includes the shield member 224 is explained with reference to FIGS. 16A and 16B. FIG. 16A shows the portable device according to this exemplary embodiment in the retracted state, and FIG. 16B shows the portable device according to this exemplary embodiment in the extended state. As shown in FIG. 16A, the shield member 224 is folded inside the portable device in the retracted state. Then, when the upper unit 100 is slid to the right side in the drawing to extend the portable device and the engaging section 227 passes through the curved section 134, the upper unit 100 is inclined with respect to the lower unit 200. In this state, the shield member 224 rises up as shown in FIG. 16B. That is, one end of the shield member 224 is rotatably supported by the rotation pin 226, and the shield member sliding pin 225 that slides in the groove 133 of the guide member is disposed at the other end of the shield member 224. Then, when the engaging section 227 passes through the curved section 134 and the upper unit 100 is thereby inclined with respect to the lower unit 200, the position of the shield member sliding pin 225, which is sliding in the groove 133, is shifted upward as a result of this action. During this action, the shield member 224 rotates around the rotation pin 226 and thereby rises up.

Figure 17:
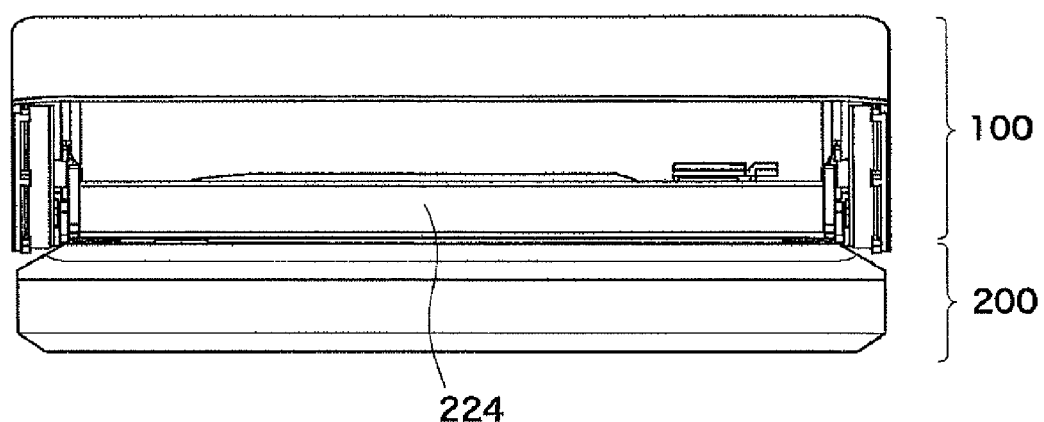
FIG. 17 is a front view of a portable device according to an exemplary embodiment in an extended state.
Figure 18:
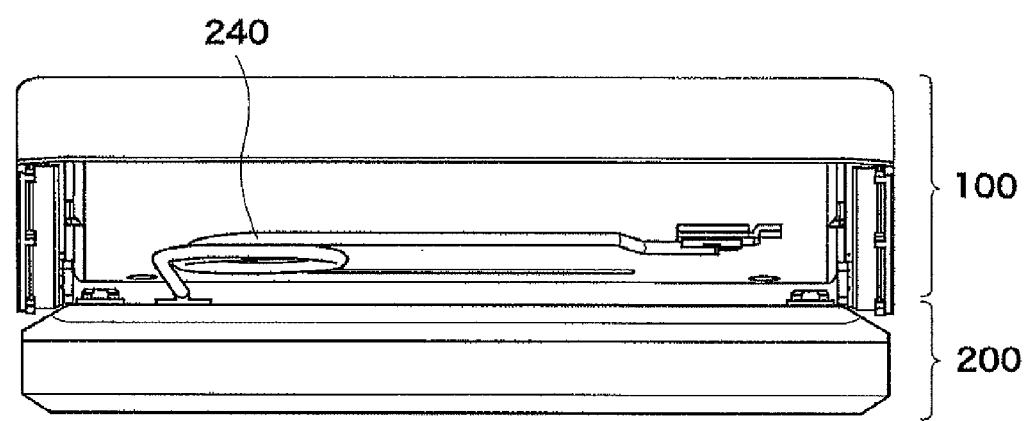
FIG. 18 is a front view of a portable device using no shield member in an extended state.

FIG. 17 is a front view of a portable device using the shield member 224 in the extended state. Further, FIG. 18 is a front view of a portable device using no shield member 224 in the extended state. In FIG. 17, since the shield member 224 rises up at the extended state, the mechanical components located between the upper unit 100 and the lower unit 200, such as the torsion spring can be shielded from the outside. Therefore, it is possible to prevent dust and the like from getting into these mechanical components and thereby prevent these mechanical components from malfunctioning. In contrast to this, in FIG. 18, since no shield member 224 is provided, the mechanical components located between the upper unit 100 and the lower unit 200, such as the torsion spring are exposed to the outside. In this case, dust and the like could get into these mechanical components, and thereby causing the mechanical components to malfunction.

In the sliding mechanism of the portable device according to this exemplary embodiment explained above, the groove of the guide member includes a curved section that makes the upper unit incline at a predetermined angle with respect to the lower unit in the extended state. Further, it is possible to reduce the size of the sliding mechanism because the sliding mechanism includes the engaging section that supports the upper wall surface of the groove of the guide member at at least two points and supports the lower wall surface of the groove by a surface. Further, it is also possible to improve the operability because the engaging section can smoothly pass through the groove of the guide member. Further, since the engaging section supports the upper wall surface of the groove at two points, the contact area between the engaging section and the groove can be reduced. Therefore, it is possible to reduce the friction that occurs when the engaging section slides in the groove. Further, by using resin material for the engaging section that comes into contact with the guide member, the friction that occurs when the engaging section slides in the groove can be reduced even further. Therefore, by the portable device according to this exemplary embodiment, it is possible to provide a compact sliding mechanism having an excellent operability for the sliding mechanism of portable devices having an inclination mechanism.

In particular, by integrally forming the sliding member 220 with the protrusion 222 by using a metal member and constructing the engaging section 227 by engaging the resin member 223 with the protrusion 222 made of the metal member as shown in FIGS. 11A and 11B, it is possible to reduce the friction that occurs when the engaging section 227 slides in the groove 133 of the guide member while maintain the strength of the engaging section 227, and thereby enabling the engaging section 227 to pass through the curved section 134 more smoothly.

Figure 19:
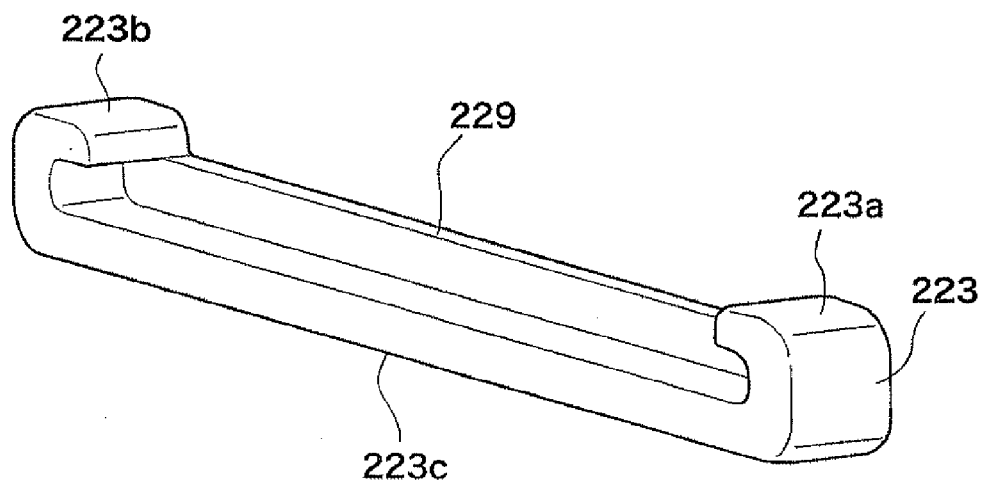
FIG. 19 is a perspective view showing another example of a resin member of a portable device according to an exemplary embodiment.
Figure 20:
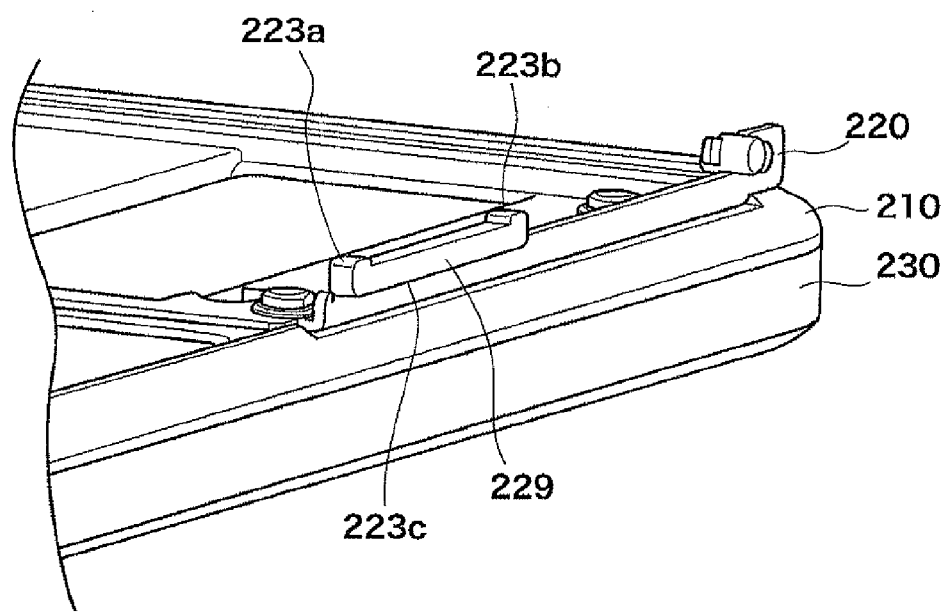
FIG. 20 is a perspective view showing a sliding member using a resin member shown in FIG. 19 for an engaging section.

As for the resin member 223 used for the engaging section 227 of the portable device according to this exemplary embodiment, a resin material 223 shown in FIG. 19 may be also used. In the resin material 223 shown in FIG. 19, a wall-surface section 229 is provided in a place between the protrusion 222 and the inner side surface of the guide member 131a or 131b. That is, the wall-surface section 229 is provided in the resin member 223 shown in FIGS. 11A and 11B. FIG. 20 is a perspective view showing the sliding member 220 using the resin member 223 shown in FIG. 19 for the engaging section 227. As shown in FIG. 20, when the resin member 223 shown in FIG. 19 is used, the wall-surface section 229 becomes the outer side of the engaging section 227 (that is, the protrusion 222 is not exposed to the wall-surface section in contrast to the configuration shown in FIGS. 11A and 11B). Since this wall-surface section 229 can come into contact with the inner wall of the groove 133 of the guide member 131a or 131b, the engaging section 227 can slide in the groove of the guide member more smoothly.

Figure 21:
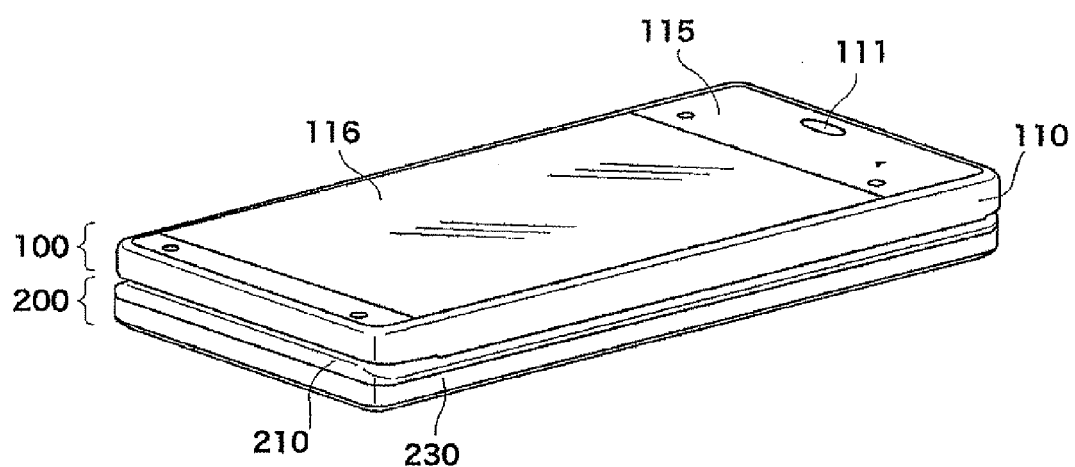
FIG. 21 is a perspective view showing another aspect of a portable device according to an exemplary embodiment.

Note that in this exemplary embodiment, a case where the engaging section 227 includes two supporting parts, i.e., the engaging section 227 supports the upper wall surface of the groove 133 of the guide member at two points is explained. However, in the portable device according to the present invention, the only requirement is that the upper wall surface of the groove 133 should be supported at at least two points. That is, the number of the supporting parts of the engaging section 227 can be increased as appropriate. However, although the strength of the engaging section 227 can be increased by increasing the number of the supporting parts, the friction that occurs when the engaging section slides in the groove of the guide member also increases. Therefore, it is necessary to adjust the number of the supporting parts according to the desired characteristics. Further, the cutout section (recessed section) is formed at or near the center of the engaging section 227 so that part of the guide member comes into the cutout section when the engaging section 227 passes through the curved section 134. Further, the portable device according to this exemplary embodiment can be also applied to portable devices in which the display-unit cover 116 itself functions as a touch panel as shown in FIG. 21. In this case, as shown in FIG. 21, the key operation unit 113, which is provided in the portable device shown in FIG. 1, can be omitted.

So far, the present invention has been explained with the above-described exemplary embodiments. However, the present invention is not limited to the above-described exemplary embodiments, and needless to say, various modifications, corrections, and combinations that can be made by those skilled in the art are also included in the scope of the present invention specified in the claims of the present application.

This application is based upon and claims the benefit of priority from Japanese patent application No. 2010-116121, filed on May 20, 2010, the disclosure of which is incorporated herein in its entirety by reference.

INDUSTRIAL APPLICABILITY

The present invention can be applied to portable devices having a sliding mechanism.

REFERENCE SIGNS LIST

100 UPPER UNIT
110 UPPER CASE
111 RECEIVER SOUND HOLE
113 KEY OPERATION UNIT
115 UPPER COVER
116 DISPLAY-UNIT COVER
120 DISPLAY UNIT
130 GUIDE MEMBER UNIT
131A, 131B GUIDE MEMBER
132 CONNECTING PLATE
133 GROOVE
134 CURVED SECTION
200 LOWER UNIT
210 LOWER CASE
212 MOUNTING PART
220 SLIDING MEMBER
221 BASE
222 PROTRUSION
223 RESIN MEMBER
223A, 223B SUPPORT SECTION
223C FLAT SECTION
227 ENGAGING SECTION
228 MOUNTING HOLE
229 WALL-SURFACE SECTION
230 LOWER COVER
240 TORSION SPRING

The invention claimed is:
1. A portable device, comprising:
a first unit comprising a guide member with a groove, the guide member extending in a sliding direction; and
a second unit comprising a sliding member that slides in the groove of the guide member,
wherein the groove of the guide member comprises a curved section that makes the first unit incline at a predetermined angle with respect to the second unit in an extended state,
wherein the sliding member comprises an engaging section that engages with the groove of the guide member, the engaging section being configured to support one surface of the groove of the guide member at at least two points and to support another surface of the groove by a surface, and
wherein the engaging section comprises:
at least two supporting parts on one surface; and
a flat section on another surface opposite to the one surface.
2. The portable device according to claim 1, wherein the at least two supporting parts support said one surface of the groove, and the flat section supports said another surface of the groove.
3. The portable device according to claim 1, wherein the groove of the guide member comprises one inner wall surface and another inner wall surface opposed to the one inner wall surface.

4. The portable device according to claim 3, wherein the at least two supporting parts of the engaging section support the one inner wall surface of the guide member and the flat section of the engaging section supports the another surface of the guide member.

5. The portable device according to claim 2, wherein the engaging section further comprises a recessed section between the at least two supporting parts.

6. The portable device according to claim 1, wherein the engaging section further comprises a protrusion formed on the sliding member by using a metal material and a resin member that engages with the protrusion.

7. The portable device according to claim 6, wherein the resin member is disposed so as to surround the protrusion and the supporting parts and the flat section comprise a resin material.

8. The portable device according to claim 1, wherein the engaging section is formed on the sliding member by using a metal material.

9. The portable device according to claim 8, wherein a surface of the engaging section is coated with a resin.

10. The portable device according to claim 6, wherein the resin member comprises a wall-surface section between a side surface located between one inner wall surface of the guide member and another inner wall surface of the guide member and the protrusion.

11. The portable device according to claim 1, wherein the engaging section is formed on the sliding member by using a resin material.

12. The portable device according to claim 6, wherein the resin member comprises at least one of POM, PBT, PPS, ABS, PC, nylon, aramid, and PEEK.

13. The portable device according to claim 1, wherein the groove of the guide member comprises the curved section at one end of the groove extending in the sliding direction.

14. The portable device according to claim 13, wherein the groove of the guide member is inclined at a predetermined angle with respect to upper/lower surfaces of the first unit in a range between another end of the groove extending in the sliding direction and the curved section.

15. The portable device according to claim 1, wherein the guide member comprises a metal material.

16. The portable device according to claim 15, wherein the guide member comprises a material containing at least one of steel, stainless steel, an aluminum alloy, a magnesium alloy, and a titanium alloy.

17. The portable device according to claim 1, wherein the guide member comprises a plurality of guide members that are respectively placed in both ends of the first unit, and comprise grooves in places that are opposed to each other, the guide member being fabricated by cutting, forging, or molding, and being bonded to a connecting plate by welding, gluing, or adhesion.

18. The portable device according to claim 2, wherein the groove of the guide member comprises one inner wall surface and another inner wall surface opposed to the one inner wall surface.

19. The portable device according to claim 1, wherein the sliding member further comprises a shield member that is rotatably supported via a rotation pin by the sliding member.

20. The portable device according to claim 1, wherein the sliding member further comprises a shield member that is supported by the sliding member.

* * * * *